(12) United States Patent
Haskins et al.

(10) Patent No.: US 9,969,501 B2
(45) Date of Patent: May 15, 2018

(54) AIRCRAFT FUEL TANK ARRANGEMENT (71) Applicant: AIRBUS OPERATIONS LIMITED, Bristol (GB)

(72) Inventors: Richard Haskins, Bristol (GB); John Jones, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 868 days.

(21) Appl. No.: 14/194,596

(22) Filed: Feb. 28, 2014

(65) Prior Publication Data
US 2015/0122948 A1    May 7, 2015

(30) Foreign Application Priority Data

Feb. 28, 2013 (GB) .................................. 1303611.6

(51) Int. Cl.
*B64D 37/32* (2006.01)
*B64D 37/04* (2006.01)
*B64D 45/00* (2006.01)

(52) U.S. Cl.
CPC .............. *B64D 37/32* (2013.01); *B64D 37/04* (2013.01); *B64D 45/00* (2013.01)

(58) Field of Classification Search
CPC ......... B64D 37/32; B64D 37/04; B64D 45/00
See application file for complete search history.

(56) References Cited

U.S. PATENT DOCUMENTS

| | | | | |
|---|---|---|---|---|
| 2,813,691 A | * | 11/1957 | Seeger | B64D 37/04 244/135 R |
| 3,906,976 A | * | 9/1975 | Nohr | B64D 37/32 137/68.26 |
| 4,263,929 A | * | 4/1981 | Kearney | F16K 17/16 137/557 |
| 4,301,938 A | * | 11/1981 | Wood | F16K 17/1626 137/68.24 |
| 4,372,334 A | * | 2/1983 | Paul, Jr. | F16K 17/16 137/118.06 |

(Continued)

FOREIGN PATENT DOCUMENTS

| | | |
|---|---|---|
| CA | 1167738 A2 | 5/1984 |
| CA | 1172936 A  | 8/1984 |

(Continued)

OTHER PUBLICATIONS

UKIPO Search Report for Application No. GB1303611.6, dated Jul. 9, 2013.

(Continued)

*Primary Examiner* — Tien Q Dinh
*Assistant Examiner* — Steven Hawk
(74) *Attorney, Agent, or Firm* — Hauptman Ham, LLP (57) ABSTRACT

An aircraft fuel tank arrangement for the relief of a pressure differential between the interior of the aircraft fuel tank and the ambient atmosphere is provided. The aircraft fuel tank arrangement comprises a removable cartridge received within a cartridge-receiving body located at least partially in the fuel tank, said cartridge comprising a first burstable member operable to rupture in the presence of a pressure differential between the interior of the aircraft fuel tank and the ambient atmosphere which is greater than a predetermined pressure differential.

20 Claims, 5 Drawing Sheets

(56) References Cited

U.S. PATENT DOCUMENTS

| | | | | |
|---|---|---|---|---|
| 4,403,626 A | * | 9/1983 | Paul, Jr. | F16K 11/0873 137/118.07 |
| 4,408,194 A | * | 10/1983 | Thompson | F16K 17/162 137/68.18 |
| 4,444,214 A | * | 4/1984 | Paul, Jr. | F16K 17/16 137/315.11 |
| 4,553,559 A | * | 11/1985 | Short, III | F16K 17/162 137/68.25 |
| 4,576,303 A | | 3/1986 | Mundt et al. | |
| 4,662,126 A | * | 5/1987 | Malcolm | B65D 90/36 220/89.2 |
| 4,978,947 A | * | 12/1990 | Finnegan | F16K 17/16 116/266 |
| 5,050,630 A | * | 9/1991 | Farwell | F16K 17/162 137/68.25 |
| 5,082,133 A | * | 1/1992 | Farwell | F16K 17/1613 137/68.21 |
| 5,121,847 A | * | 6/1992 | Ellis | F16K 17/1633 220/203.08 |
| 5,583,490 A | * | 12/1996 | Santos | F16K 17/16 137/557 |
| 5,913,807 A | * | 6/1999 | Bak | F02C 7/22 60/734 |
| 5,996,605 A | * | 12/1999 | Farwell | F16K 17/16 137/68.21 |
| 6,178,983 B1 | * | 1/2001 | Culliinane | F16K 17/1606 137/68.21 |
| 6,230,733 B1 | * | 5/2001 | Strelow | F16K 17/16 137/68.23 |
| 6,311,715 B1 | * | 11/2001 | Wadkins | F16K 17/16 137/68.23 |
| 6,321,582 B1 | | 11/2001 | Cullinane et al. | |
| 9,315,276 B2 | * | 4/2016 | Alazraki | B64D 37/32 |
| 2001/0052358 A1 | * | 12/2001 | Cullinane | F16K 17/1606 137/68.25 |
| 2008/0078457 A1 | * | 4/2008 | Sandiford | B64D 13/02 137/493 |
| 2008/0149772 A1 | * | 6/2008 | Sandiford | B64D 37/005 244/135 R |
| 2008/0295905 A1 | * | 12/2008 | Sandiford | B64D 37/005 137/587 |
| 2009/0314783 A1 | * | 12/2009 | Losinski | B64D 37/08 220/530 |
| 2012/0025026 A1 | * | 2/2012 | French | B64D 37/005 244/135 R |
| 2012/0273239 A1 | * | 11/2012 | Brennan | A62C 4/00 169/45 |
| 2013/0263934 A1 | * | 10/2013 | Hutchings | F16K 17/00 137/68.23 |
| 2013/0306796 A1 | * | 11/2013 | Alazraki | B64C 3/34 244/129.2 |
| 2014/0239122 A1 | * | 8/2014 | Hottin | B29C 70/88 244/135 R |
| 2016/0229553 A1 | * | 8/2016 | Kamihara | B64D 45/04 |

FOREIGN PATENT DOCUMENTS

| | | |
|---|---|---|
| CN | 101891017 A | 11/2010 |
| CN | 202209321 U | 5/2012 |
| CN | 102649474 A | 8/2012 |
| CN | 102812224 A | 12/2012 |
| CN | 102895747 A | 1/2013 |
| EP | 0247402 A1 | 12/1987 |
| GB | 786872 A | 11/1957 |
| GB | 1413259 A | 11/1975 |
| WO | 2004081433 A2 | 9/2004 |

OTHER PUBLICATIONS

BS&B Safety Systems; An Introduction to Rupture Disk Technology; Catalog 77-1001; Section A Apr. 2, 2012.

BS&B Safety Systems; Type ITC Rupture Diskk Cargo-Gard™; Catalog 77-8002; Section C-8 Apr. 2, 2012.

BS&B Safety Systems; Bio-Saf System; Catalog 77-4015 Section D Apr. 2, 2012.

BS&B Safety Systems; Burst Disk Monitors; Catalog 77-1009; Section B Apr. 2, 2012.

BS&B Safety Systems; Burst Alert® Sensor for Immediate Warning of a Pressure Relief Event; Catalog 77-1010 Apr. 2, 2012.

Oseco Rupture Disk Selection Guide Oct. 15, 2012.

Oseco Website Extract Regarding Defense & Transport Dec. 24, 2012.

UKIPO Search Report for Application No. GB1303611.6, dated Jan. 31, 2014.

BS&B Safety Systems;FRB Frustum Reverse Buckling Rupture Disk; Catalog 77-4008; Section D-4 Apr. 2, 2012.

Office Action and Search Report dated Oct. 10, 2016 Chinese Application No. 201410073825.6.

\* cited by examiner

FIG. 5

AIRCRAFT FUEL TANK ARRANGEMENT

RELATED APPLICATIONS

The present application is a based on and claims priority to United Kingdom Application Number GB1303611.6, filed Feb. 28, 2013, the disclosure of which is hereby incorporated by reference herein in its entirety.

BACKGROUND OF THE INVENTION

The present invention relates to an aircraft fuel tank arrangement for the relief of a pressure differential between the interior of the aircraft fuel tank and the ambient atmosphere.

The presence of a significant pressure differential across the inner and outer surfaces of an aircraft fuel tank can be undesirable. If the pressure differential is too high, there is a risk that the fuel tank may implode or explode, leading to a loss of fuel and rupture to the surface of the wing skin of an aircraft. Such ruptures may be uncontrolled and therefore potentially dangerous. Such pressure differentials may be positive (in which case the pressure on the inside of the fuel tank is higher than on the outside of the fuel tank) or negative (in which case the pressure on the outside of the fuel tank is greater than the pressure inside the fuel tank). Such pressure differentials may occur at various times during operation of the aircraft (for example, during fuelling, refuelling, defueling and when the aircraft is making certain manoeuvres). For example, when an aircraft climbs the pressure inside the tank typically exceeds that outside the tank. Conversely, when an aircraft descends the pressure inside the tank is typically lower than the pressure outside the tank.

Relief of excessive pressure differentials has been addressed in several ways. A simple yet effective solution is to provide what is known as a stackpipe (effectively a tube) which extends from the outer surface of the fuel tank (which typically forms an outer surface of the aircraft) into the interior of the fuel tank. A burst disk is provided at the end of the stackpipe which is inside the fuel tank. The interior surface of the burst disk is subjected to the pressure inside the fuel tank and the exterior surface of the burst disk is subjected to the pressure outside the fuel tank (ambient atmospheric pressure). At a predetermined pressure differential (less than the pressure differential required to cause a rupture of the fuel tank) the burst disk will rupture, thereby allowing rapid equalisation of pressure and preventing an undesirable increase in the pressure differential which otherwise may cause the wing fuel tank to rupture. The stackpipe ensures that any fuel below the open end of the stackpipe inside the fuel tank remains inside the fuel tank. It has been discovered, however, that the cavity formed beneath the stackpipe and burst disk may lead to acoustic resonance when the aircraft is in motion, such resonance creating noise (typically a whistle) and occasionally leading to unwanted rupture of the burst disk. This is obviously, undesirable. The resonance problem has been successfully addressed by placing a gauze across the middle portion of the stackpipe.

An alternative solution to the alleviation of pressure differentials is to provide the fuel tank with a valve operable to allow rapid equalisation of pressure. Such valves are reusable and therefore offer certain advantages over the simple burst disk. However, such valves are relatively expensive and typically comprise moving parts, and therefore require regular inspection to ensure that the valve will operate when required to do so.

The object of the present invention is to ameliorate one or more of the problems mentioned above.

SUMMARY OF THE INVENTION

In accordance with a first aspect of the present invention there is provided an aircraft fuel tank arrangement for the relief of a pressure differential between the interior of the aircraft fuel tank and the ambient atmosphere, the aircraft fuel tank arrangement comprising a removable cartridge received within a cartridge-receiving body located at least partially in the fuel tank, said cartridge comprising a first burstable member operable to rupture in the presence of a pressure differential between the interior of the aircraft fuel tank and the ambient atmosphere which is greater than a predetermined pressure differential.

The word "cartridge" indicates that the cartridge is typically self-contained. The word "removable" indicates that the cartridge may be readily removed. The cartridge is typically single-use. The cartridge is typically replaceable i.e. one cartridge would be removed and a similar cartridge inserted. The cartridge may be removed by a suitably-qualified technician without causing damage to the rest of the fuel tank arrangement. The first burstable member essentially forms a burstable barrier between the interior of the fuel tank and the ambient atmosphere. One surface (an interior surface) of the first burstable member is subjected to the pressure inside the aircraft fuel tank, whilst another surface (an outer surface) of the first burstable member is subjected to the ambient atmospheric pressure. When the pressure differential between the interior of the fuel tank and the ambient pressure is greater than a predetermined level, the first burstable member will rupture.

The first burstable member is optionally fixedly attached to a cartridge wall. The wall may be provided by a cartridge body portion. The first burstable member may optionally not be removed from the cartridge without the first burstable member breaking.

The aircraft fuel tank may be provided by an aircraft wing, therefore the aircraft fuel tank may be an aircraft wing fuel tank. The fuel tank provided with the cartridge may optionally be a surge tank. The aircraft wing may extend from the fuselage of the aircraft to a wing tip, the cartridge optionally being located closer to the wing tip than to the fuselage.

The first burstable member may optionally be provided at or near to an end of the cartridge which is associated with an outer surface of the aircraft fuel tank. The first burstable member may be substantially flush with one or more adjacent surfaces, such as one or more of a surface of the cartridge, a surface of the cartridge-receiving body adjacent the first burstable member and an outer surface of the fuel tank adjacent to the first burstable member. It is typically the outer surface of the first burstable member that may be flush with one or more adjacent surfaces. In this case, the peripheral regions of the first burstable member typically neither protrude significantly from, nor are recessed significantly from, surfaces adjacent to the peripheral regions of the first burstable member. A significant protrusion or recess may optionally be of the order of 5 mm. Therefore, the peripheral regions of the first burstable member should optionally neither protrude nor be recessed by more than 5 mm relative to the adjacent surfaces. Such an arrangement may be effective in reducing the resonance associated with placing a burst disk in the interior of the fuel tank. Such an arrangement may also be effective in reducing drag and therefore the fuel consumption of the aircraft.

The cartridge may optionally comprise a second burstable member operable to rupture in the presence of a pressure differential across the second burstable member which is more than a predetermined pressure differential. Typically, one surface of the second burstable member will be subjected to a first pressure and another surface will be subjected to a second pressure. When the difference between the first and second pressures is greater than a predetermined value, the second burstable member will rupture. The second burstable member will typically be operable to rupture at a pressure differential which is different from the pressure differential required to rupture the first burstable member. If the cartridge comprises such a second burstable member, the first and second burstable members will typically be mutually spaced along the length of the cartridge. For example, the first burstable member will typically be located inwardly of the second member. The first burstable member may optionally be located at or proximate to a first end of the cartridge and the second burstable member may optionally be located at or proximate to a second end of the cartridge. The first end of the cartridge may be located in the interior of the fuel tank, and the second end will be proximate or flush with the outer surface of the aircraft. The meaning of the term "flush" is discussed above. The second burstable member may be substantially flush with adjacent surfaces, such as one or more of a surface of the cartridge, a surface of the cartridge-receiving body adjacent the second burstable member and an outer surface of the fuel tank adjacent to the second burstable member.

By placing the first burstable member at the end of the cartridge inside the fuel tank and by placing a second burstable member flush with the outer surface of the aircraft, then the resonance problem may be reduced, whilst reducing fuel loss when a pressure differential occurs. Drag may also be reduced, therefore reducing fuel consumption.

If the cartridge comprises a second burstable member, the aircraft fuel tank arrangement may be provided with at least one fluid flow pathway between the exterior of the aircraft fuel tank and the space between the first and second burstable members. This allows the first burstable member to be subjected to the ambient pressure outside the aircraft. The at least one fluid flow pathway may be provided by one or more apertures provided in the second burstable member. Such apertures are typically small so that the burst capabilities of the second burstable member are not significantly diminished. The second burstable member may be shaped so that water collecting on the second burstable member is directed to at least one of the apertures provided in the second burstable member.

The second burstable member, if present, is optionally fixedly attached to a cartridge wall. The wall may be provided by a cartridge body portion. The second burstable member may optionally not be removed from the cartridge without the second burstable member breaking.

For the avoidance of doubt, it is hereby stated that the rupturing of the first burstable member (and second burstable member, if present) is irreversible; after rupture, the respective burstable member cannot be returned to its previous state in which it forms a barrier as mentioned above. This is in contrast to a valve in which a valve member typically moves back (or may be physically moved back) to a barrier-providing state once a pressure differential has been relieved.

The first and second burstable members may optionally be in the form of burst disks. Such burst disks are well known to those skilled in the art.

The cartridge is optionally in sealing engagement with the cartridge-receiving body. The cartridge may be provided with at least one fluid tight seal member for forming a seal with the cartridge-receiving body. This may be facilitated using one or more sealing members, such as "O" rings.

One or more sealing members may be provided at or proximate to a first end of the cartridge and one or more sealing members may be provided at or proximate to a second end of the cartridge.

The cartridge may comprise a cartridge body portion extending into the aircraft fuel tank. The cartridge body portion may be substantially cylindrical i.e. having roughly the same cross-sectional shape and size along the length of the body portion. Alternatively, the cartridge body portion may be frusto-conical. The cartridge body portion optionally defines a fluid pathway between the inside and the outside of the aircraft fuel tank in the event of operation of a sufficient pressure differential; this may be achieved for example, by providing a tubular cartridge body portion.

The first and, if present, second burstable members may be attached to, and/or located within the cartridge body portion. For example, the first burstable member may be located at or proximate to a first end of the cartridge body portion, and the second burstable member may be located at or proximate to a second end of the cartridge body portion.

The first and/or second burstable member (if present), may be optionally be provided with at least one continuous resistive or optically transmissive elements for indicating whether the respective burstable member has been ruptured. The first and/or second burstable element provided with at least one continuous resistive or optically transmissive elements may be operable to burst so as to make the at least one continuous resistive or optically transmissive element discontinuous. Such resistive elements may be readily probed using standard electrical components. When the optically transmissive element becomes discontinuous it typically become optically non-transmissive at the break or discontinuity. The optically transmissive element may comprise a fibre optic element.

The first (and second, if present) burstable members may typically be in the form of a plate, typically in the form of a disk. The plate may be any suitable shape, but is typically thin to enable bursting at suitable pressure differentials. The plate is typically operable to burst when the pressure on one side of the plate is sufficiently different form the pressure on the other side of the plate. The plate may be substantially flat, or may be concave or convex.

The cartridge-receiving body may optionally comprise a tubular portion for the receipt of the cartridge. The cartridge-receiving body may comprise one or more flanges for facilitating attachment to an aircraft structure. The one or more flanges may optionally project outwardly from a tubular portion of the cartridge-receiving body.

In accordance with a second aspect of the present invention, there is provided a cartridge for use in the aircraft fuel tank arrangement of the first aspect of the present invention. The cartridge of the second aspect of the present invention may comprise those features described above in relation to the aircraft fuel tank arrangement of the first aspect of the present invention.

In accordance with a third aspect of the present invention, there is provided an aircraft fuel tank arrangement for the relief of a pressure differential between the interior of the aircraft fuel tank and the ambient atmosphere, the aircraft fuel tank arrangement comprising a first burstable member operable to rupture when the pressure differential between the interior of the aircraft fuel tank and the ambient atmospheric pressure is greater than a predetermined pressure differential, the first burstable member being substantially flush with one or more adjacent surfaces.

"Flush" may mean that the outer peripheral regions of the first burstable member typically neither protrude significantly from, nor are recessed significantly from, surfaces adjacent to the peripheral regions of the first burstable member. It is typically the outer surface or surfaces of the first burst disk that is flush with the one or more adjacent surfaces. A significant protrusion or recess may be of the order of 5 mm. Therefore, the peripheral regions of the first burstable member should neither protrude nor be recessed by more than 5 mm relative to the adjacent surfaces. Said adjacent surfaces may be provided by one or more of a support (if present) for supporting the first burstable member and the outer surface of the fuel tank adjacent to the first burstable member.

The aircraft fuel tank arrangement may comprise a second burstable member operable to rupture in the presence of a pressure differential across the second burstable member in excess of a predetermined pressure differential. If a second burstable member is provided, the first burstable member is typically located outwardly of the second burstable member. In the aircraft fuel tank arrangement of the third aspect of the present invention, the pressure differential required to rupture the second burstable member will typically be greater than the pressure differential required to rupture the first burstable member. The first burstable member of the aircraft fuel tank arrangement of the third aspect of the present invention may have the features of the first or second burstable member (and typically the second burstable member) described above in relation to the aircraft fuel tank arrangement of the first aspect of the present invention. The second burstable member of the aircraft fuel tank arrangement of the third aspect of the present invention may have the features of the first or second burstable member (and typically the first burstable member) described above in relation to the aircraft fuel tank arrangement of the first aspect of the present invention.

The aircraft fuel tank arrangement may comprise a support for supporting the first (and, if present, the second) burstable member. The support may be in the form of a removable cartridge as described above in relation to the aircraft fuel tank arrangement of the first aspect of the present invention. The support may comprise a body which, in the absence of the first and second burstable members provides a fluid pathway between the interior of the aircraft fuel tank and the ambient atmosphere. The support body may comprise a cylindrical portion extending into the aircraft fuel tank. For the avoidance of doubt, the aircraft fuel tank arrangement of the third aspect of the present invention may comprise those features described above with reference to the aircraft fuel tank arrangement of the first aspect of the present invention.

In accordance with a fourth aspect of the present invention, there is provided an aircraft fuel tank arrangement for the relief of a pressure differential between the interior of the aircraft fuel tank and the ambient atmosphere, the aircraft fuel tank arrangement a first burstable member operable to rupture in the presence of a pressure differential across the first burstable member which is greater than a predetermined pressure differential, and a second burstable member operable to rupture in the presence of a pressure differential across the second burstable member which is greater than a predetermined pressure differential, the first burstable member forming a burstable barrier between the interior of the aircraft fuel tank and the second burstable member.

The aircraft fuel tank arrangement may be provided with one or more fluid pathways between the exterior of the aircraft fuel tank and the space between the first and second burstable members. This allows the first burstable member to be subjected to the ambient pressure outside the aircraft. The at least one fluid flow pathway may be provided by one or more apertures provided in the second burstable member. Such apertures are typically small so that the burst capabilities of the second burstable member are not significantly diminished. The second burstable member may be shaped so that water collecting on the second burstable member is directed to at least one of the apertures provided in the second burstable member.

The pressure differential required to rupture the first burstable member is typically greater than the pressure differential required to rupture the second burstable member.

The aircraft fuel tank arrangement may be provided with a removable cartridge, for example. The removable cartridge may be provided with the first and second burstable members.

The burstable members used in the fuel tank arrangements of the third and fourth aspects of the present invention typically operate in the same manner as those described in relation to the fuel tank arrangement of the first aspect of the present invention. They are typically plate-like, typically in the form of a disk, and are operable to burst when the pressure on one side of the plate is sufficiently different form the pressure on the other side of the plate.

For the avoidance of doubt, the aircraft fuel tank arrangement of the fourth aspect of the present invention may comprise those features described above with reference to the aircraft fuel tank arrangements of the first and third aspects of the present invention There is provided in accordance with a fifth aspect of the present invention, a system for detecting the failure of a pressure-differential rupture member associated with an aircraft fuel tank, the system comprising:

(a) A rupture member operable to rupture in the presence of a pressure differential between the interior of the aircraft fuel tank and ambient atmospheric pressure which exceeds a predetermined pressure differential, the rupture member comprising one or more continuous resistive or optically transmissive elements, the electrical or optical characteristics of which change on rupture of the rupture member;

(b) An interrogating system operable to interrogate the electrical or optical characteristics of the one or more continuous resistive or optically transmissive elements, to produce an output indicative of the rupture status of said rupture member.

On rupture of the rupture member, the one or more continuous resistive or optically transmissive elements become non-continuous. Rupture of the rupture member is typically associated with breakage of the continuous resistive or transmissive element (typically making the resistive element open-circuit or the optically transmissive element non-transmissive). Each continuous resistive element is optionally in the form of a track or line of electrically conductive material, such as a metal. Such lines or tracks of electrically conductive material cross pre-defined lines or regions of weakness along which the rupture member is operable to fail when subjected to sufficiently high pressure differentials. The optically transmissive element may comprise a fibre optic element. The rupture member used in the system of the fifth aspect of the present invention may comprise those features of the first burstable member described above in relation to the fuel tank arrangement of the first aspect of the present invention.

The system may further comprise an indicator responsive to the output of the interrogating system for indicating the rupture status of the disk. The indicator may comprise a light, for example, an advisory/caution or warning light.

The system of the fifth aspect of the present invention may comprise one or more features of the aircraft fuel tank arrangements of the first, third and/or fourth aspects of the present invention. The system of the fifth aspect of the present invention may comprise the aircraft fuel tank arrangements of the first, third and/or fourth aspects of the present invention.

There is provided in accordance with a sixth aspect of the present invention, a system for controlling an event in response to the rupture of a pressure-differential rupture member associated with an aircraft fuel tank, the system comprising a system in accordance with the fifth aspect of the present invention, and a controller operable in response to the output from the interrogating system to control one or more aircraft functions dependent on the rupture status of the rupture member. For example, the controller may be associated with the aircraft and may be coupled to the flight control system of the aircraft so that a particular flight condition which may have led to the rupture may be corrected by the controller. Alternatively or additionally, for example, the controller may be coupled to a fuelling system so that fuelling may be controlled by the controller in response to a rupture occurring. Alternatively or additionally, the controller may be coupled to one or more pumps or valves, the controller being effective to control the operation of the one or more pumps or valves in response to a rupture occurring.

One or more features of one aspect of the present invention may be incorporated into another aspect of the present invention. For example, one or more features of the aircraft fuel tank arrangement of the first aspect of the present invention may be incorporated into the aircraft fuel tank arrangements of the third and fourth aspects of the present invention. Likewise, one or more features of the aircraft fuel tank arrangements of the third aspect of the present invention may be incorporated into the aircraft fuel tank arrangements of the first and fourth aspects of the present invention. Furthermore, one or more features of the aircraft fuel tank arrangements of the fourth aspect of the present invention may be incorporated into the aircraft fuel tank arrangements of the first and third aspects of the present invention.

DESCRIPTION OF THE DRAWINGS

The present invention will now be described by way of example only with reference to the following figures of which.

DETAILED DESCRIPTION

Figure 1:
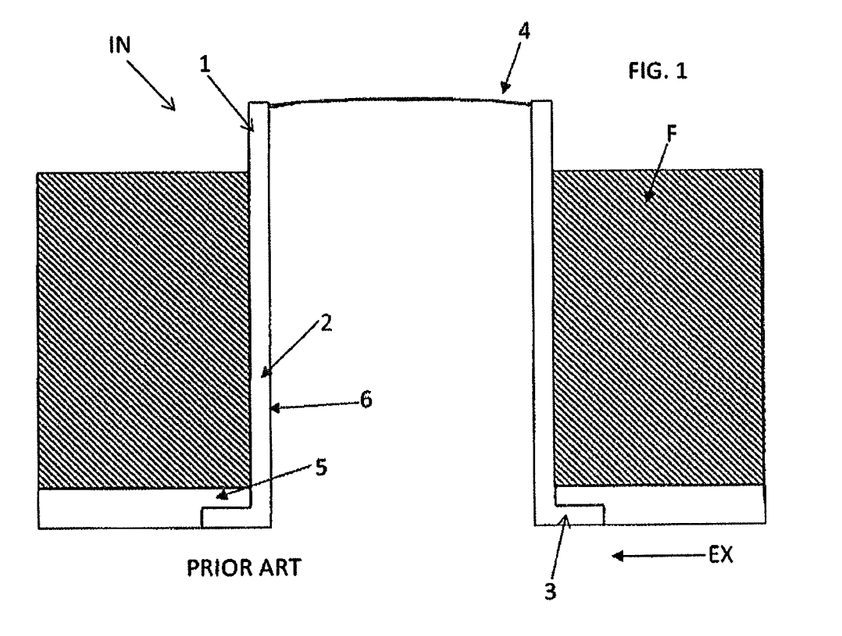
FIG. 1 is a cross-section through a known fuel tank arrangement for relieving undesirable pressure differentials between the interior and exterior of the fuel tank.

A known fuel tank arrangement for relieving pressure differential between the interior of the aircraft fuel tank and the ambient atmosphere is shown in cross-section in FIG. 1. The known arrangement is denoted generally by reference numeral 1 and comprises what is often known to those skilled in the art as a stack pipe 2 located in the aircraft wing 5. The wing is typically a wet wing i.e. one that acts as a fuel tank. The stack pipe 2 is typically located in the underside of the wing 5, towards the wing tip, typically in an overflow or surge tank. The stack pipe 2 comprises a cylindrical main body 6, one end of which is provided with an annular flange 3, and the other end of which is provided with a burst disk 4. The flange 3 provides a suitable means of locating and fixing the stack pipe to the aircraft wing 5. Depending on the amount of fuel in the fuel tank, fuel F may surround stack pipe 2. The burst disk 4 forms a burstable barrier between the interior of the fuel tank (denoted by IN) and the ambient atmosphere exterior to the fuel tank (denoted by EX). There will typically be a pressure differential between the interior of the fuel tank and the ambient atmosphere. When such pressure differentials are below a threshold value, the burst disk 4 remains intact. When the pressure differential is above a threshold value (typically about 8 psig for a tank overpressure and about 5 psig for a tank underpressure), the burst disk 4 will burst, thereby permitting pressure equalisation between the interior of the fuel tank and the ambient atmosphere. The purpose of the burst disk 4 is to prevent an uncontrolled bursting of the wing fuel tank itself which could be dangerous. The burst disk will therefore burst at a pressure differential (about 8 psig for an over pressure in the tank and about 5 psig for an under pressure in the tank) which is substantially lower than the pressure differential required to burst the wing fuel tank (typically about 15 psi). The threshold pressure differential for bursting the disk may be different for implosion (ambient pressure greater than interior fuel tank pressure) and explosion (ambient pressure less than interior fuel tank pressure).

One problem with this known aircraft fuel tank arrangement is that the column of air beneath the burst disk 4 sometimes leads to an acoustic resonance problem when the aircraft is in motion. This manifests itself by producing a whistling sound, and sometimes by causing an unwanted bursting of the burst disk 4. Furthermore, it is believed that the fuel tank arrangement with an opening in the lower wing skin at the mouth of the stack pipe contributes to drag, estimated to be equivalent to about 10 kg in extra weight. This is obviously undesirable.

Figure 2:
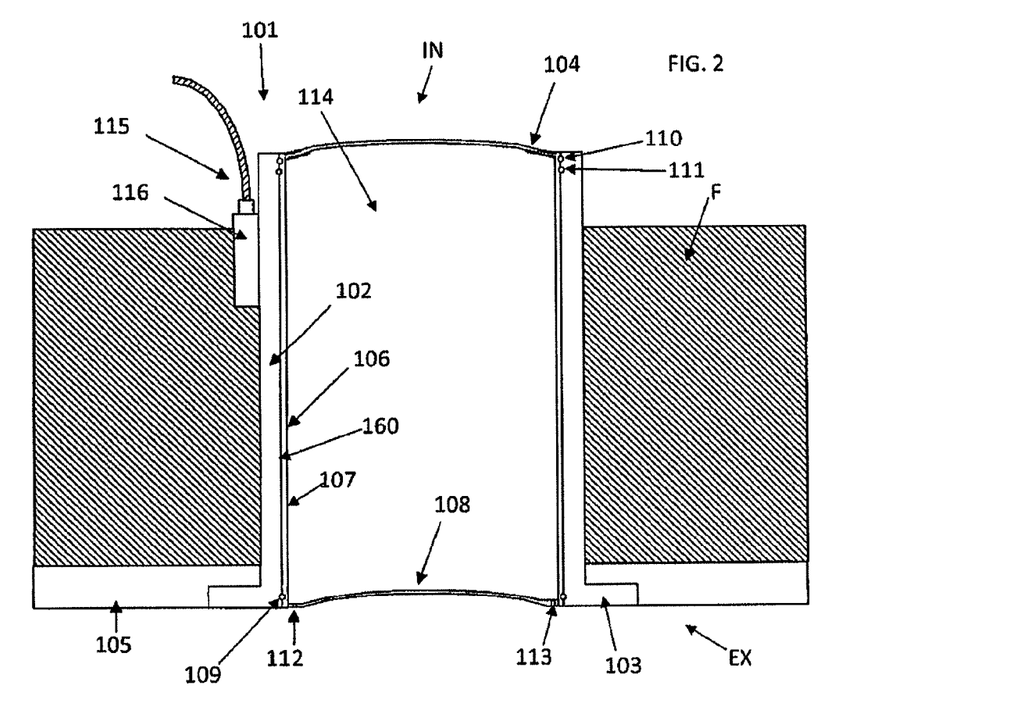
FIG. 2 is a cross-section through an example of a fuel tank arrangement in accordance with the first, third and fourth aspects of the present invention.
Figure 3:
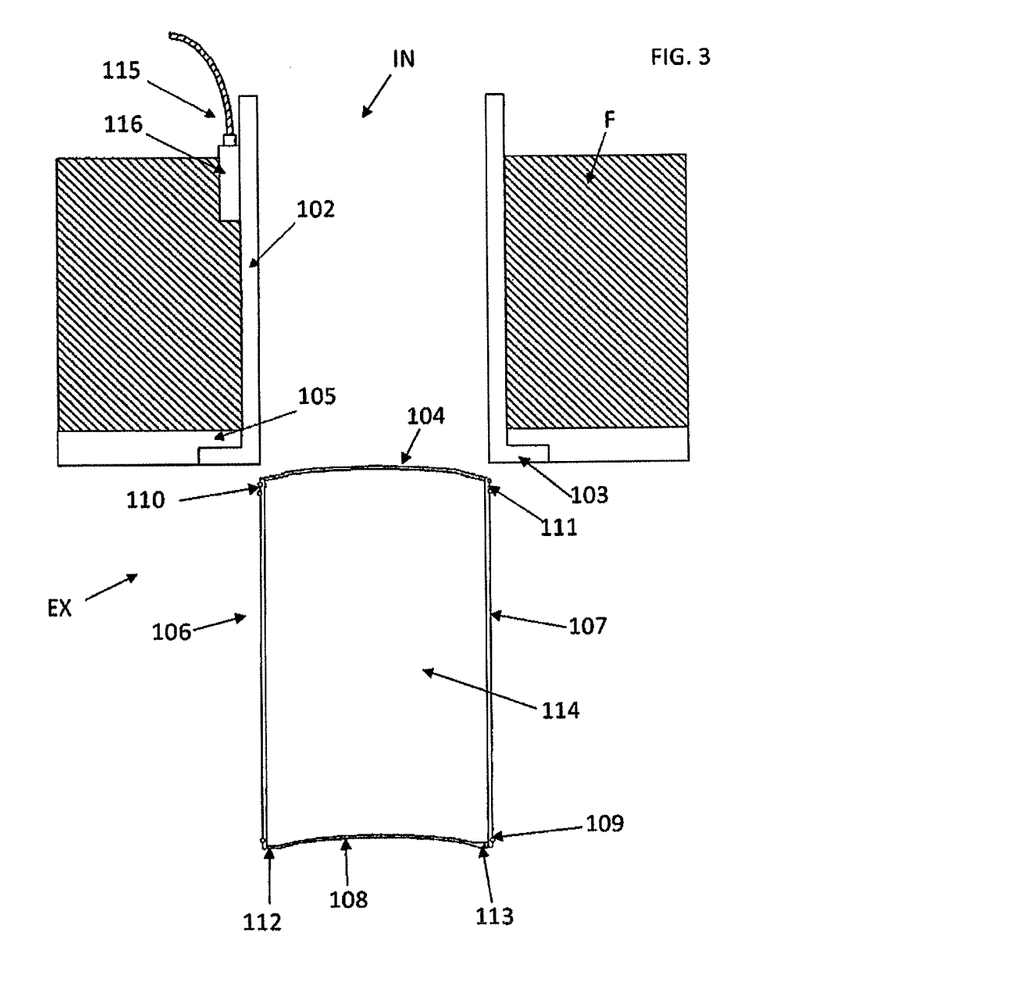
FIG. 3 is a cross-section through the fuel tank arrangement of FIG. 2, with the cartridge withdrawn from the aircraft wing fuel tank.

An example of an aircraft fuel tank arrangement in accordance with the present invention will now be described with reference to FIGS. 2, 3 and 4. The aircraft fuel tank arrangement is denoted generally by reference numeral 101, and comprises a removable cartridge 106 located within stack pipe 102 which is, in turn, located in the wing 105 of an aircraft. The stack pipe 102 is essentially the same as stack pipe 2 described above in relation to FIG. 1, having a cylindrical stack pipe main body 160 and an annular flange 103 at one end thereof. However, unlike the stack pipe of FIG. 1, the stack pipe of FIGS. 2 and 3 is not provided with a burst disk; the removable cartridge 106 is provided with a burst disk. Indeed, canister 106 comprises a cylindrical cartridge main body 107 having a first burst disk 104 attached to the interior end of the cartridge main body and a second burst disk 108 attached to the exterior end of the cartridge main body. Air tight seals between the cartridge main body 107 and the stack pipe main body 160 are provided by three O rings, two of which 110, 111 are located towards the inner end of the cartridge and stack pipe and one of which 109 is located towards the outer end of the cartridge and stack pipe. The air tight seals are provided to prevent unwanted fluid pathways between the interior (IN) and exterior (EX) of the aircraft wing 105. Air flow paths are provided by apertures 112, 113 located in second burst disk 108. This allows air to flow into region 114 between the first and second burstable disks so that the outer surface of first burst disk 104 is subject to ambient pressure outside the aircraft.

Operation of the aircraft fuel tank arrangement will now be described with reference to FIGS. 2 and 3. When there is a small pressure differential between the interior of the aircraft wing fuel tank [IN] and the exterior of the fuel tank [EX], then the first and second burst disks 104, 108 remain intact. If the pressure differential between the interior of the fuel tank and the ambient atmosphere reaches or is greater than a threshold value, then first burst disk 104 will burst. The threshold value for burst of the first burst disk will typically be 8 psig for tank overpressure and 5 psig for tank underpressure, considerably lower than the pressure differential typically required to cause wing rupture. Second burst disk 108 ruptures very shortly after, and almost simultaneously with, rupture of first burst disk 104. The pressure differential required to rupture second burst disk 108 is typically about 3 psi, significantly lower than that required to rupture first burst disk 104. Furthermore, the apertures 112, 113 provided in second burst disk 108 are sufficiently small to prevent equalisation of pressure across second burst disk 108 by air moving through apertures 112, 113 in the event of a bursting of the first burst disk 104. The apertures 112, 113 also facilitate drainage of any water which accumulates in region 114. The second burst disk being slightly concave assists in the direction of water to apertures 112, 113.

The outer surface of second burst disk 108 is substantially flush with the outer surface of flange 103 adjacent to the second burst disk 108. In particular, the periphery of second burst disk 108 is flush with the outer surface of the flange 103 adjacent to the periphery of the burst disk 108. This reduces drag compared to the prior art aircraft fuel tank arrangement of FIG. 1 and mitigates against the establishment of resonance which could cause unwanted noise or unwanted disk burst.

The cartridge 106 is readily removable as indicated in FIG. 3. This is to facilitate simple and inexpensive replacement of burst disks; one cartridge is removed from the stack pipe 160 and a new, substantially identical cartridge inserted into stack pipe 160.

Figure 4:
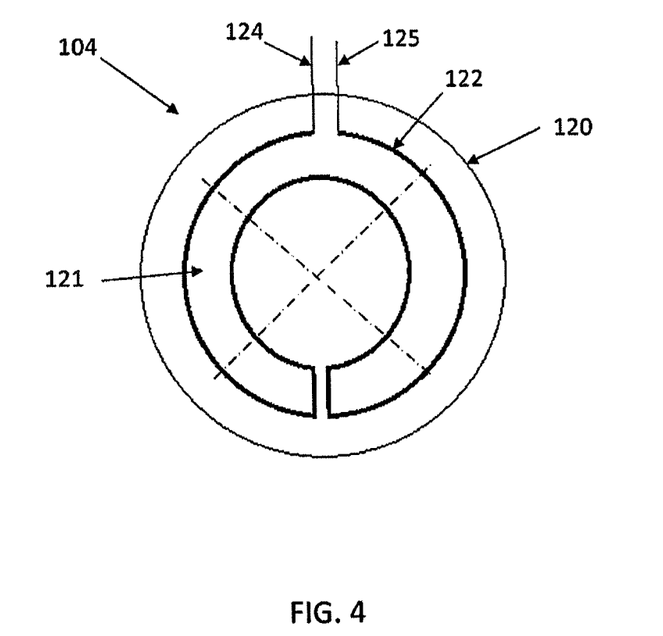
FIG. 4 is a perspective view of a burst disk used in the fuel tank arrangement of FIGS. 2 and 3.

A plan view of first burst disk 104 is shown in FIG. 4. The first burst disk 104 comprises an outer mounting rim 120 and a burstable central region 121. The central region 121 is typically provided with regions of weakness which permit burst of the central region when subjected to a pressure differential across the surfaces of the central region which is greater than a predetermined pressure differential. Those regions of weakness are shown as dashed lines in FIG. 4, and form a cross shape. The central region 121 is provided with a continuous path 122 of conductive material. The electrical properties of the path of conductive material may be probed via wires 124, 125 which are connected to terminal block 116.

Terminal block 116 is connected to a control system (not shown) by cable 115. In the event of a disk burst, the disk fails along the dashed lines shown in FIG. 4, thereby breaking the path of conductive material 122, resulting in an open circuit. This open circuit may be sensed by the control system. The control system may be arranged to respond to the change in electrical properties in an appropriate manner. For example, it may be desirable for the aircraft to lose altitude following a disk burst. The control system can therefore be arranged to communicate with an aircraft control system, providing inputs to the aircraft control system commensurate with a desire to reduce aircraft altitude. Alternatively or additionally, the burst of the disk may cause an appropriate signal to be generated in the aircraft cockpit.

Figure 5:
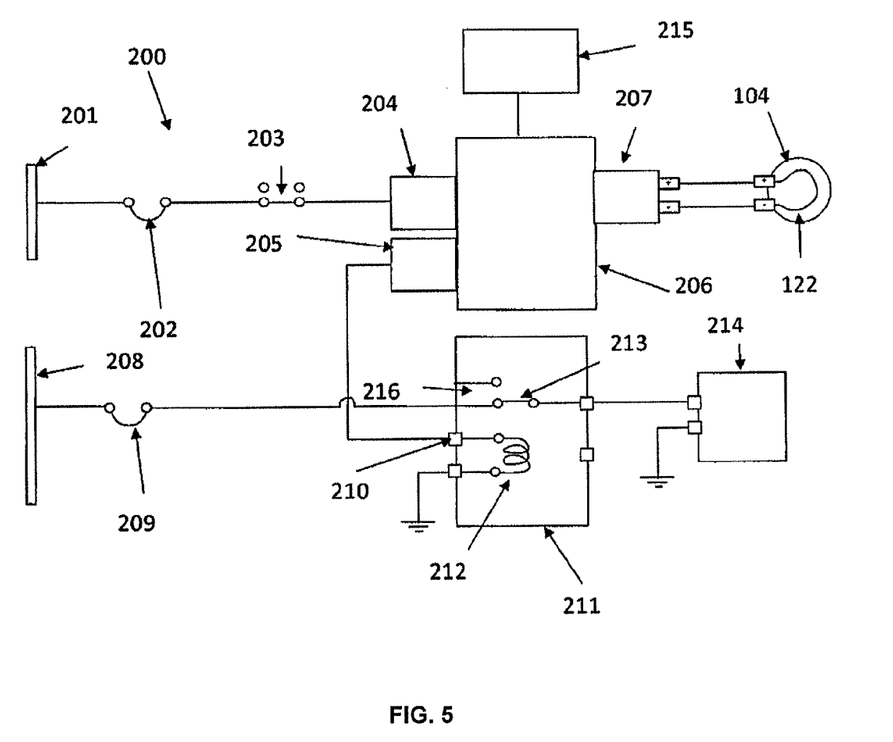
FIG. 5 is a schematic representation of a system which controls the operation of a refuel valve dependent on the rupture status of a burst disk.

An example of a system which controls the operation of a refuel valve dependent on the rupture status of a burst disk is now described with reference to FIG. 5. The system, which is denoted generally by reference numeral 200, controls the operation of refuel valve 214. The system 200 comprises a fuel management module 206 having an input 204 and a related output 205. The input 204 draws power from a busbar 201, subject to a refuel switch 203 being closed. In the event that the refuel switch is closed, no power is provided to the input 204.

A burst disk monitoring module 207 is provided to interrogate the burst disk 104. A potential difference is provided across a continuous path 122 of conductive material. The fuel management module 206 is arranged so that if the burst disk 104 and continuous path 122 of conductive material are intact and the refuel switch 203 is closed, a signal is transmitted via output 205 to a relay input 210. The fuel management module 206 is also arranged so that if the burst disk 104 and continuous path 122 of conductive material are not intact and the refuel switch 203 is closed, a signal is not transmitted via output 205 to a relay input 210.

The presence or absence of an input signal to relay input 210 causes a relay 211 to operate in a manner well known to those skilled in the art. If a signal is provided to relay input 210, electromagnet 212 operates to attract armature 213 into a position which closes switch 216, thereby providing power from busbar 208 to the refuel valve 214 via circuit breaker 209. The refuel valve 214 is operable so that when power is applied to the valve, the valve is open to facilitate refuelling. In the absence of a signal at relay input 210, the electromagnet 212 does not attract armature 213, and armature 213 is biased into a non-contact position so that switch 216 is open, in which case, no power is provided to refuel valve 214 and therefore refuel valve 214 is closed.

The fuel management module 206 is further in communication with cockpit flight warning module 215 so that in the event of rupture of the burst disk 104, a signal is transmitted to the cockpit flight warning module 215 which, in turn, generates a crew-recognisable warning signal which is indicative of the failure of the burst disk. On failure of the burst disk, a signal may also be sent from the fuel management module 206 to a maintenance management module (not shown) which records the failure and optionally generates a crew-recognisable or engineer-recognisable warning signal indicative of the failure of the burst disk.

Those skilled in the art will realise that for certain aspects of the present invention, it is not necessary to have two burst disks; one will suffice. Furthermore, for certain aspects of the present invention, it is not necessary for the burst disk to be provided with electrical circuitry or optical fibres which senses for the failure of the disk. Those skilled in the art will also realise that for certain aspects of the invention, it will not be necessary to use a cartridge arrangement. Those skilled in the art will realise that for certain aspects of the invention, it is not necessary for a burst disk to be flush with the surrounding surfaces.

The burst disks described above have regions of weakness which form a cross shape. Other arrangements are possible, for example, one or more circular regions of weakness may be provided.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft fuel tank arrangement for the relief of a pressure differential between the interior of the aircraft fuel tank and the ambient atmosphere, the aircraft fuel tank arrangement comprising a removable cartridge received within a cartridge-receiving body located at least partially in the fuel tank, said cartridge comprising:
a first burstable member operable to rupture in the event that said pressure differential between the interior of the aircraft fuel tank and the ambient atmosphere is greater than a predetermined pressure differential;
a second burstable member operable to rupture in the event that said pressure differential is greater than a predetermined pressure differential, the predetermined pressure differential required to burst the second burstable member being different from the predetermined pressure differential required to burst the first burstable member;
the first and second burstable members being spaced apart, thereby defining a space therebetween, at least one fluid flow pathway being provided between the ambient atmosphere outside the aircraft fuel tank and the space between the first and second burstable members; and,
wherein the at least one fluid flow pathway is provided by one or more apertures provided in the second burstable member.

2. An aircraft fuel tank arrangement according to claim 1 wherein the first and second burstable members are spaced along a length of the cartridge.

3. An aircraft fuel tank arrangement according to claim 2 wherein the first burstable member is located inwardly of the second member.

4. An aircraft fuel tank arrangement according to claim 1 wherein the first burstable member is located at or proximate to a first end of the cartridge and the second burstable member is located at or proximate to a second end of the cartridge.

5. An aircraft fuel tank arrangement according to claim 4 wherein the first end of the cartridge is located in the interior of the fuel tank, and the second end is proximate to, or flush with, one or more adjacent surfaces.

6. An aircraft fuel tank arrangement according to claim 1 wherein the second burstable member is shaped so that water collecting on the second burstable member is directed to at least one of the apertures provided in the second burstable member.

7. An aircraft fuel tank arrangement according to claim 1 wherein the first and second burstable members are burst disks.

8. An aircraft fuel tank arrangement according to claim 1 comprising at least one fluid tight sealing member between the cartridge and the cartridge-receiving body.

9. An aircraft fuel tank arrangement according to claim 8 wherein one or more sealing members is provided at or proximate to a first end of the cartridge and one or more sealing members is provided at or proximate to a second end of the cartridge.

10. An aircraft fuel tank arrangement according to claim 1 wherein the cartridge comprises a cartridge body portion extending into the aircraft fuel tank.

11. An aircraft fuel tank arrangement according to claim 10 wherein the cartridge body portion is substantially cylindrical or frusto-conical.

12. An aircraft fuel tank arrangement according to claim 10 wherein the cartridge body portion defines a fluid pathway between the inside of the aircraft fuel tank and the ambient atmosphere outside the aircraft fuel tank in the event of operation of a sufficient pressure differential to rupture the first and second burstable members.

13. An aircraft fuel tank arrangement according to claim 10 wherein the cartridge body portion is tubular.

14. An aircraft fuel tank arrangement according to claim 10 wherein the first and second burstable members are attached to, and/or located within the cartridge body portion.

15. An aircraft fuel tank arrangement according to claim 1, further comprising at least one continuous resistive or optically transmissive element for indicating whether the respective burstable member has been ruptured being attached to, or provided on, the first and/or second burstable member, the first and/or second burstable element which is provided with at least one continuous electrically-resistive or optically-transmissive element being operable to burst so as to make the at least one continuous electrically-resistive or optically-transmissive element discontinuous.

16. A cartridge for use in the aircraft fuel tank arrangement according to claim 1.

17. A system for detecting the failure of a pressure-differential burstable member associated with an aircraft fuel tank, the system comprising:
(a) an aircraft fuel tank arrangement according to claim 15; and,
(b) an interrogating system operable to interrogate the electrical or optical characteristics of the one or more continuous electrically-resistive or optically-transmissive elements, and to produce an output indicative of the rupture status of said burstable member.

18. A system for controlling an event in response to the rupture of a pressure-differential rupture member associated with an aircraft fuel tank, the system comprising a failure detection system according to claim 17, and a controller operable in response to the output from the interrogating system to control one or more aircraft functions dependent on the rupture status of the burstable member.

19. An aircraft fuel tank arrangement according to claim 1, the cartridge being elongate.

20. An aircraft fuel tank arrangement for the relief of a pressure differential between the interior of the aircraft fuel tank and the ambient atmosphere, the aircraft fuel tank arrangement comprising a removable elongate tubular cartridge received within a cartridge-receiving body located at least partially in the fuel tank, said cartridge comprising:
a first burst disk operable to rupture in the event that said pressure differential between the interior of the aircraft fuel tank and the ambient atmosphere is greater than a predetermined pressure differential; and the second burst disk being operable to rupture in the event that said pressure differential is greater than a predetermined pressure differential, the predetermined pressure differential required to burst the second burst disk being different from the predetermined pressure differential required to burst the first burst disk, the first burst disk being located at, or proximate, to a first end of the cartridge and the second burst disk being located at, or proximate, to a second end of the cartridge, thereby providing a space between the first and second burst disks;

one or more apertures being provided in the second burst disk to provide at least one fluid flow pathway between the ambient atmosphere outside the aircraft fuel tank and the space between the first and second burst disk;

one or more sealing members being provided at, or proximate, to the first end of the cartridge between the cartridge and the cartridge-receiving body, and one or more sealing members being provided at, or proximate to, the second end of the cartridge between the cartridge and the cartridge-receiving body.

* * * * *